US008888876B2

(12) United States Patent
Tsang et al.

(10) Patent No.: US 8,888,876 B2
(45) Date of Patent: Nov. 18, 2014

(54) TWO STAGE ENTRAINED GASIFICATION SYSTEM AND PROCESS

(71) Applicant: Lummus Technology Inc., Bloomfield, NJ (US)

(72) Inventors: Albert C. Tsang, Sugar Land, TX (US); Chancelor L. Williams, Katy, TX (US); Max W. Thompson, Sugar Land, TX (US); David L. Breton, Houston, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 0 days.

(21) Appl. No.: 13/889,463

(22) Filed: May 8, 2013

(65) Prior Publication Data

US 2013/0240790 A1    Sep. 19, 2013

Related U.S. Application Data

(63) Continuation of application No. 12/192,471, filed on Aug. 15, 2008, now Pat. No. 8,460,410.

(51) Int. Cl.
*C01B 6/24* (2006.01)
*C10J 3/46* (2006.01)

(52) U.S. Cl.
USPC ............. 48/197 R; 48/210; 423/644; 423/650

(58) Field of Classification Search
USPC ........................................ 48/197 R
See application file for complete search history.

(56) References Cited

U.S. PATENT DOCUMENTS

| 2,782,913 | A | | 2/1957 | Donath |
| 3,782,913 | A | * | 1/1974 | Donath ........................... 48/202 |
| 4,323,446 | A | | 4/1982 | Chervenak et al. |
| 4,872,886 | A | * | 10/1989 | Henley et al. ................ 48/197 R |
| 2007/0094929 | A1 | * | 5/2007 | Kang et al. ....................... 48/111 |

FOREIGN PATENT DOCUMENTS

| CN | 1051055 A | 5/1991 |
| DE | 4105280 A1 | 8/1991 |
| EP | 1031623 A2 | 8/2000 |
| JP | 4-503526 | 6/1992 |

OTHER PUBLICATIONS

Fong, William S. et al.; "Plastic Behavior of Coal Under Rapid-Heating High-Temperature Conditions'" Dept. of Chemical Engineering and Energy Laboratory; Massachusetts Institute of Technology, Cambridge, MA; pp. 115-126.
Second Office Action (w/translation) issued Jun. 25, 2013 in corresponding Chinese application No. 200980131465.8 (29 pages).

(Continued)

*Primary Examiner* — Matthew Merkling
(74) *Attorney, Agent, or Firm* — Osha • Liang LLP

(57) ABSTRACT

The present invention relates to a system and process for gasifying feedstock such as carbonaceous materials. The invention includes partial combustion of dry solids and pyrolysis of carbonaceous material slurry in two separate reactor sections and produce mixture products comprising synthesis gas. The invention employs one or more catalytic or sorbent bed for removing tar from the synthesis gas. The inventive system and process allow a gasification to be carried out under higher slurry feeding rate and lower temperature with the provision to manage the tar being produced, therefore to increase the conversion efficiency of the overall gasification.

19 Claims, 2 Drawing Sheets

(56) References Cited

OTHER PUBLICATIONS

Translation of First EXamination Report issued in corresponding Saudi application No. 109 30 0437 (2 pages).

Office Action issued Nov. 18, 2013 in corresponding Canadian application No. 2,820,088 (3 pages).

Notice of Reasons for Rejection (w/translation) mailed Feb. 18, 2014 in corresponding Japanese application No. 523015/11 (3 pages).

* cited by examiner

TWO STAGE ENTRAINED GASIFICATION SYSTEM AND PROCESS

CROSS-REFERENCE TO RELATED APPLICATION

This application is a Continuation Patent Application of U.S. Ser. No. 12/192,471, filed Aug. 15, 2008 and entitled, "Two Stage Entrained Gasification System and Process".

BACKGROUND OF THE INVENTION

The present invention relates generally to a gasification system and process for gasifying feedstock such as carbonaceous materials. Three basic types of system and processes have been developed for the gasification of carbonaceous materials. They are: (1) fixed-bed gasification, (2) fluidized-bed gasification, and (3) suspension or entrainment gasification. The present invention relates to the third type of system and process—suspension or entrainment gasification. More particularly, the present invention relates to a two stage entrained gasification system and process for gasifying carbonaceous materials.

Gasification systems and processes are often applied for converting generally solid feedstock such as carbonaceous material into desirable gaseous products such as synthesis gas. Gasification system and process must be designed to be simple yet to deliver the maximum conversion efficiency.

SUMMARY OF THE INVENTION

One aspect of the present invention relates to a process for gasifying a carbonaceous material comprising the steps of: a) introducing recycled char into a reactor lower section and partially combusting the recycled char therein with a stream comprising an oxygen-containing gas and/or steam thereby evolving heat and forming mixture products comprising synthesis gas and molten slag; b) passing the synthesis gas from the reactor lower section upward into a reactor upper section and pyrolysing therein with a stream comprising a slurry of particulate carbonaceous material in a liquid carrier thereby forming mixture products comprising i) a gaseous product stream comprising synthesis gas and residual tar, ii) char, and iii) vapor; c) passing the mixture products from the reactor upper section through a separation device whereby the char are separated from the mixture products from the reactor upper section and recycled as feed stock to be introduced to the reactor lower section; and d) introducing the gaseous product stream from the reactor upper section comprising synthesis gas and residual tar into a reaction zone whereby the residual tar is removed. The heat evolved in the step (a) is recovered by converting the slurry of particulate carbonaceous material and the carrier liquid into the gaseous product stream in step (b). In one embodiment of the present invention, the gaseous product stream from the reactor upper section comprising synthesis gas and residual tar are introduced into a reaction zone comprising one or more catalytic bed comprising one or more tar-destruction catalysts. In another embodiment of the present invention, the gaseous product stream from the reactor upper section comprising synthesis gas and residual tar are introduced into a reaction zone comprising one or more sorbent bed comprising one or more tar-absorbent sorbent.

Another aspect of the present invention relates to a system for gasifying a carbonaceous material comprising: a) a reactor lower section for partially combusting recycled char with a stream comprising an oxygen-containing gas and/or steam to produce heat and mixture products comprising synthesis gas and molten slag; b) a reactor upper section for pyrolysing the synthesis gas from the reactor lower section with a stream comprising a slurry of particulate carbonaceous material in a liquid carrier to produce mixture products comprising i) a gaseous product stream comprising synthesis gas and residual tar, ii) char, and iii) vapor; c) a separating device for separating the char from the mixture products from the reactor upper section; and d) a reaction zone for removing residual tar from the gaseous product from the reactor upper section comprising synthesis gas and residual tar. The heat produced from reactor lower section is recovered by converting the slurry of particulate carbonaceous material and the carrier liquid in reactor upper section into the gaseous product stream in reactor upper section. The reactor lower section further comprises one or more dispersion devices for introducing the stream comprising oxygen-containing gas and steam and the recycled char into the reactor lower section. The reactor upper section further comprises one or more feeding devices for feeding the slurry of particulate carbonaceous material in the liquid carrier into the reactor upper section. The reactor upper section may be, but not limited to be, positioned above the reactor lower section. In one embodiment of the present invention, the reaction zone for removing residual tar from the gaseous product from the reactor upper section comprising synthesis gas and residual tar comprises one or more catalytic bed comprising one or more tar-destruction catalysts. In another embodiment of the present invention, the reaction zone for removing residual tar from the gaseous product from the reactor upper section comprising synthesis gas and residual tar comprises one or more sorbent bed comprising one or more tar-absorbent sorbents.

The temperature of reactor lower section is maintained from 1500° F. to 3500° F. The pressure in reactor lower section and reactor upper section are from about 14.7 psig to about 2000 psig. The velocity of gases and char passing through the dispersion devices of the reactor lower section is from 20 to 120 feet per second. The residence time of char in the reactor lower section is from 2 to 10 seconds. The velocity of the slurry stream passing through the feeding devices of the reactor upper section is from 5 to 100 feet per second. The residence time of the slurry of the particulate carbonaceous material in the reactor upper section is from 5 to 40 seconds.

BRIEF DESCRIPTION OF THE DRAWINGS

For a more detailed description of the embodiments of the present invention, reference will now be made to the accompanying drawings, wherein.

DETAILED DESCRIPTION OF THE PREFERRED EMBODIMENT

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
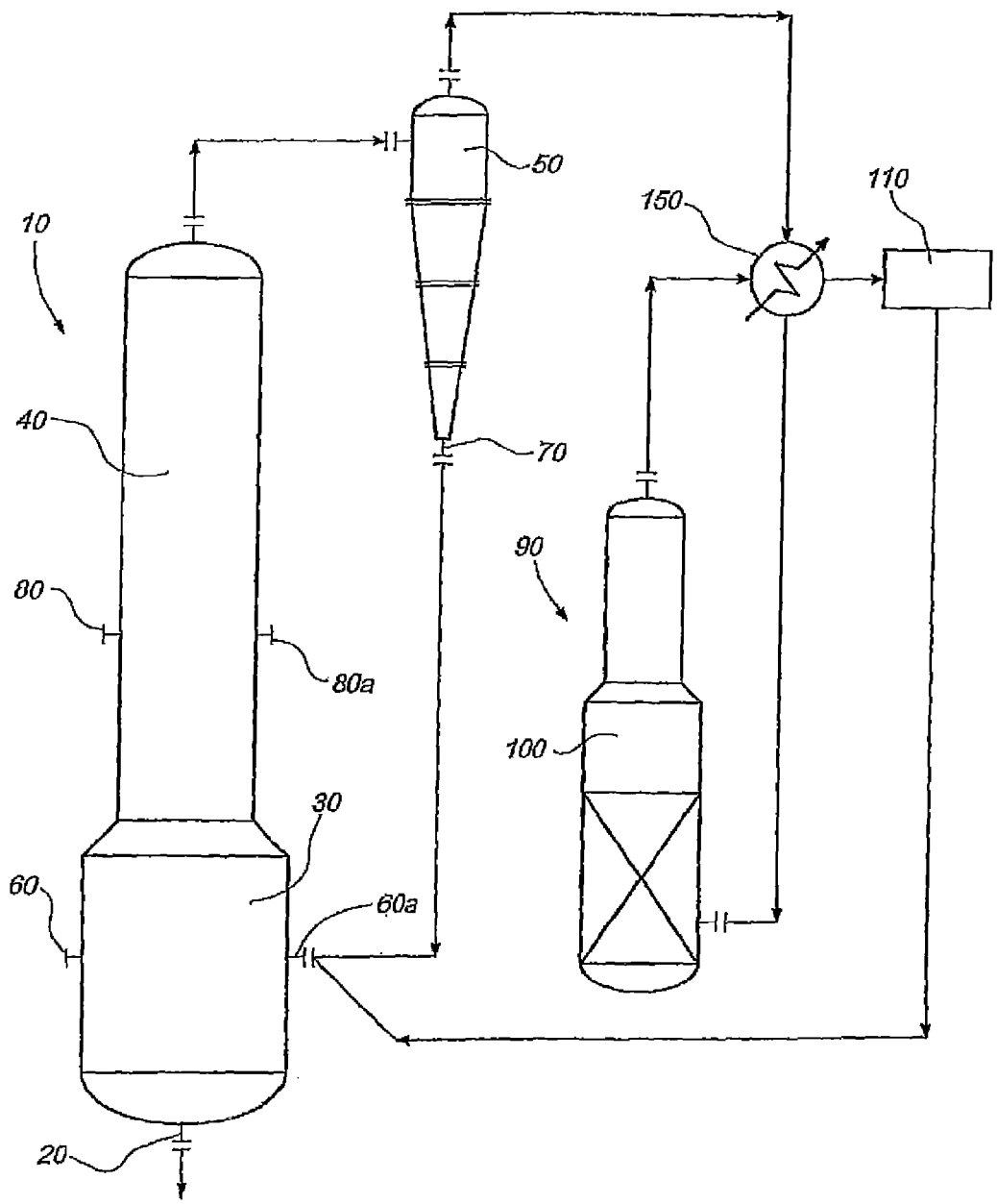
FIG. 1 is a schematic representation of a system useful in and a pictorial process flow diagram for an embodiment in connection with the present invention.

Referring to FIG. 1, various embodiments of the present invention provide a gasification reactor, indicated generally by reference numeral 10, has a reactor lower section 30 and a reactor upper section 40. The first stage of the gasification process takes place in the reactor lower section 30 and the second stage of the gasification process takes place in the reactor upper section 40. The reactor lower section 30 defines the first stage reaction zone. The reactor lower section 30 will also be referred to as the first stage reaction zone. The reactor upper section 40 defines the second stage reaction zone. The reactor upper section 40 will also be referred to as the second stage reaction zone.

Further refer to FIG. 1, the recycled char, and a stream comprising an oxygen-containing gas or steam at high pressure is entered into the gasification reactor 10 lower section 30 through dispersion device 60 and/or 60a, which located, for example, oppositely of the reactor lower section 30. More than two dispersion devices can be used, for example, four, arranged 90 degrees apart. The sets of dispersion devices can also be on different levels and do not need to be on the same plane. Within the reactor lower section 30, also the first stage reaction zone, of the gasification reactor 10, the recycled char, and a stream comprising an oxygen-containing gas and/or steam react in such fashion that rapid mixing and reaction of the reactants occur and that a rotating motion of the reactants, passing upwardly such as (but not limited as) a vortex through the lower section 30 of the reactor 10. The reaction in the reactor lower section 30 is the first stage of the gasification process by which the recycled char, and a stream comprising an oxygen-containing gas or steam are converted exothermically into mixture products comprising steam, synthesis gas, intermediate gases, and entrained by-products such as molten slag, at the reaction condition in the reactor lower section 30 as disclosed later in more detail. The molten slag is drained from the bottom of the reactor 10 through a tap hole 20, to a slag processing system (not shown) for final disposal.

The steam, intermediate, and synthesis gas then exit from reactor lower section 30 by flowing upward into an unfired reactor upper section 40 where a slurry of particulate carbonaceous solids and liquid carrier are injected through feeding device 80 and/or 80a, or additional feeding devices. The heat produced in the reactor lower section 30 and carried upward with the gas stream is used for the pyrolysis process which takes place in the unfired reactor upper section 40 (or and the concentration of these gases in the synthesis gas second stage reaction zone), including vaporization of the feed water, the carbon-steam reaction and the water-gas reaction between the CO and $H_2O$. The carbon-steam reaction forms CO and $H_2$, thus, increasing the yield of these usable gases. While the fired reactor lower section 30 (or the first stage reaction zone of the reactor 10) is primarily a combustion reactor, the reactor upper section 40 is primarily a quench reactor which also increases the heating value of the gases. The reactions occurring in unfired reactor upper section 40 thus enrich the gases emanating from the fired partial combustion reactor lower section 30 to produce a higher grade of synthesis gas and in doing so recover heat from the reactor lower section 30 and cool the gases sufficiently that the slag entrained is cooled below the ash fusion initial deformation temperature and volatile organic and inorganic species condense and absorbed on the particulate carbonaceous material. By cooling to below the ash initial deformation temperature, the entrained slag droplets fuse by themselves or on the particulate carbonaceous material prior to reaching the heat transfer surface and therefore do not adhere to heat transfer surfaces. The reaction condition in the reactor upper section 40 will be disclosed in more detail later.

In an embodiment of the present invention, as shown in FIG. 1, the unfired reactor upper section 40 of the reactor 10 is connected directly to the top of the fired reactor lower section 30 of the reactor 10 so that the hot reaction products are conveyed directly from the reactor lower section 30 to the reactor upper section 40 to minimize heat losses in the gaseous reaction products and entrained solids.

As illustrated in FIG. 1, the char produced by gasification reaction may be removed and recycled to increase carbon conversion. For example, char may be recycled through dispersion devices 60 and/or 60a (or others) into the reactor lower section, or the first reaction zone as discussed above.

The dispersion devices 60 and 60a provide an atomized feed of the particulate solids such as char. The dispersion devices may be of the type having a central tube for the solids and an annular space surrounding the central tube containing the atomizing gas which opens to a common mixing zone internally or externally. Further, the feeding device 80 and/or 80a of the unfired reactor upper section 40 may also be similar to the dispersion devices described hereinabove, or simply having a tube for slurry feeding. Dispersion devices 60, 60a, or feeding devices 80, 80a can be as are conventionally known to those skilled in the art.

As further shown in FIG. 1, the mixture products of the second stage reaction occurred in the reactor upper section 40 is withdrawn from the top of the upper section 40 of reactor 10 and introduced into a separating device 50 which splits the mixture products into a solids stream and gas stream, leaving only a small fraction of residual solid fines in the gas stream.

The gas stream comprises hydrogen, carbon monoxide, a small amount of methane, hydrogen sulfide, ammonia, water vapor or steam, vapor from the liquid carrier, nitrogen, carbon dioxide and residual tar. The solids stream comprises solidified ash and char formed in the unfired reactor upper section reactor 40 or carried over from the fired reactor lower section 30.

The solids stream such as dry char exiting from separating device 50 is mixed with oxygen-containing gas and/or steam and recycled back to the fired reactor lower section 30 through dispersion devices 60 and/or 60a as feed stock for first stage reaction.

The recycled char is then gasified under slagging conditions by reaction with oxygen and steam, producing mixture products including synthesis gas and heat required for the second stage reaction within the upper reactor section 40.

The gas stream comprising synthesis gas, residual char fines, and residual tar exiting from separating device 50 is introduced into a reaction zone 90 whereby the residual tar is removed. In one embodiment as depicted in FIG. 1 where the reaction zone 90 comprising one or more catalytic bed 100, the gas stream comprising synthesis gas and residual tar exiting from separating device 50 are heated up to 1800° F. through heat cross-exchanger 150 prior to entering the catalytic bed 100. The catalytic bed 100 may be a catalytic fluidized or bubble bed comprising one or more tar-destruction catalysts whereby the residual tar is decomposed. Heat required to bring the syngas up to reaction temperature can be supplied by external cross exchange or by injecting an oxygen and steam mixture into the syngas stream. The carbon fines are either converted to carbon monoxide or form particulates to pass upward through said catalytic fluidized bed 100 along with outlet gaseous products comprising synthesis gas. The catalytic bed 100 may also be catalytic fixed bed comprising one or more tar-destruction catalysts whereby the residual tar is decomposed. In such case, the carbon fines are removed by a particulate filter prior to the catalyst bed. With either catalytic fluidized bed or catalytic fixed bed, the hot synthesis gas exiting the reaction zone 90 is cooled by heat cross-exchanger 150 with the colder inlet gas stream (or gas stream exiting from device 50) to recover the heat. According to one embodiment, the cooled gas stream exiting heat cross-exchanger 150, which is tar-free at this point, is then passed to a particulate filter 110 whereby the particulates is removed. The tar-destruction catalysts may be zeolite, supported nickel, limestone, or any mixtures thereof.

Figure 2:
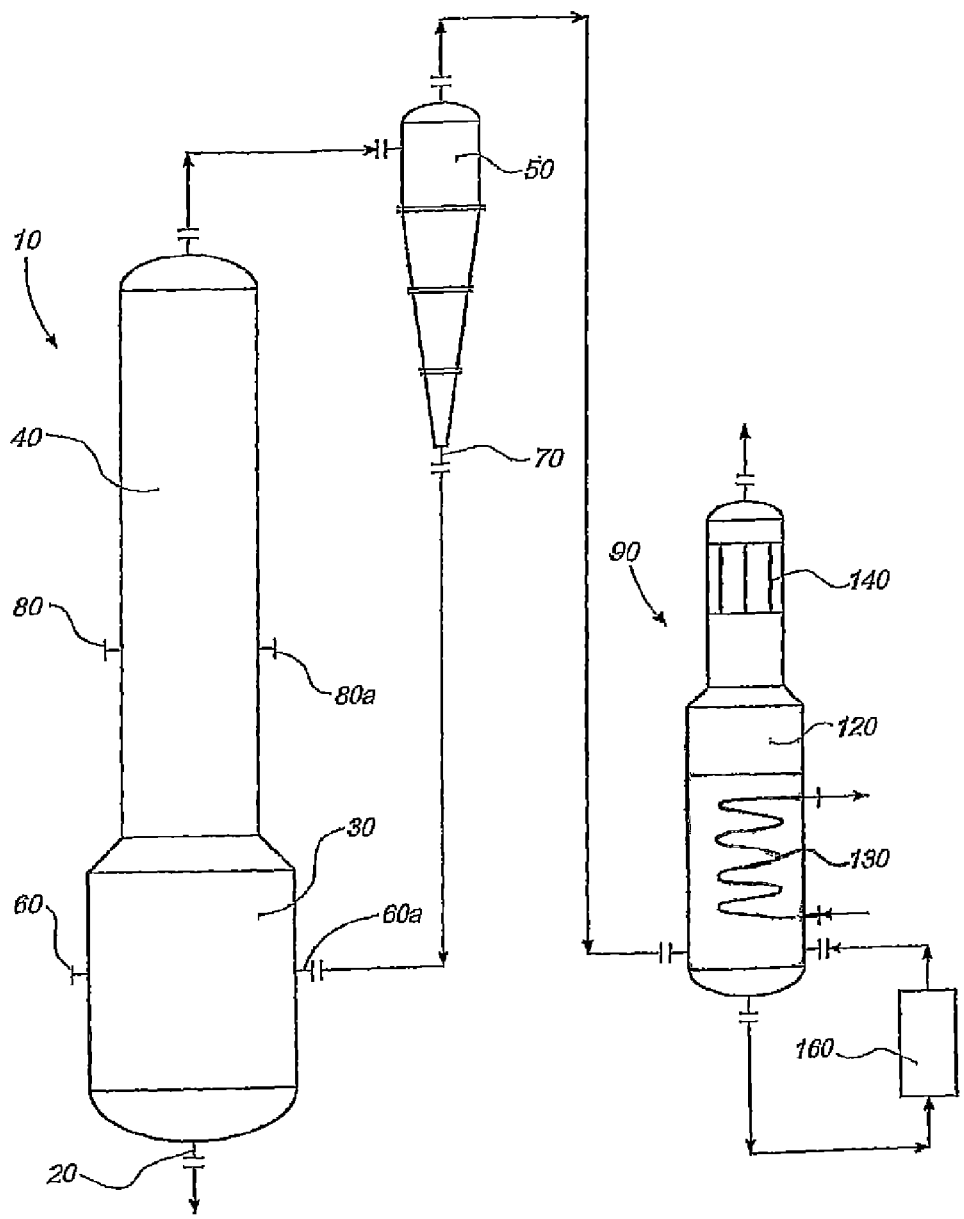
FIG. 2 is a schematic representation of a system useful in and a pictorial process flow diagram for an alternative embodiment in connection with the present invention.

In another embodiment as depicted in FIG. 2 which the reaction zone 90 comprising one or more sorbent bed 120, the gas stream comprising synthesis gas and residual tar exiting from separating device 50 are introduced into the sorbent bed 120 comprising one or more tar-absorbent sorbent whereby the residual tar is absorbed before the residual particulates are filtered by in-situ filter 140, and recycled back to the $1^{st}$ stage reactor. The sorbent bed 120 may be a fluidized activated carbon bed comprising one or more tar-absorbent sorbent. The sorbent bed 120 may also be a fixed activated carbon bed comprising one or more tar-absorbent sorbent. Since the absorption capacity of activated carbon improves at lower temperatures, internal cooling device 130 (e.g. steam-cooled, internal cooling coil, panel, or baffles) is provided for the activated carbon bed to reduced the temperature of the gas stream exiting from separating device 50, and to maintain the bed temperature at 400° F. to 500° F. A small slipstream of tar-laden activated carbon is removed from the bed either continuously or periodically to be regenerated through regenerator 160, typically by heating the carbon to a higher temperature to desorb the tar. In the case of a fixed bed absorber, two vessels in parallel could be arranged for one to be on line removing the tars and the other off line for cleaning. The gas stream exiting the reaction zone 90 at this point is tar and particulates-free synthesis gas. The tar absorbent sorbent may be activated carbon, zeolite, certain natural occurring silicates or any mixtures thereof.

The materials of construction of the gasification reactor 10 are not critical. Preferably, but not necessarily, the reactor walls are steel and are lined with an insulating castable or ceramic fiber or refractory brick, such as a high chrome-containing brick in the reactor lower section 30 and a dense medium, such as used in blast furnaces and non-slagging applications in the reactor upper section 40, in order to reduce heat loss and to protect the vessel from high temperature as well as to provide for better temperature control, all of which are commercially available from several sources. Use of this type of system provides the high recovery of heat values from the carbonaceous solids used in the process. Optionally and alternatively, the walls may be unlined by providing a "cold wall" system for fired reactor lower section 30 and, optionally, unfired upper section 40. The term "cold wall", as used herein, means that the walls are cooled by an external cooling jacket, as is known conventionally in the art for prior art coal gasification systems. In such a system, the slag freezes on the interior wall and provides for protection of the metal walls of the cooling jacket.

The physical conditions of the reaction in the first stage of the process in the reactor lower section 30 are controlled and maintained to assure rapid gasification of the char at temperatures exceeding the melting point of ash produced by char gasification to produce a molten slag from the melted ash having a slag viscosity not greater than approximately 250 poises. The physical conditions of the reaction in the second stage of the gasification process in the reactor upper section 40 are controlled to assure rapid gasification and heating of the coal above its range of plasticity. The temperature of fired reactor lower section 30 is maintained from 1500° F. to 3500° F., preferably from 2000° F. to 3200° F. and most preferably from 2400° F. to 3000° F. At such temperatures in the first stage in the reactor lower section 30, ash formed by the gasification of char therein melts to form molten slag which falls through the tap hole and is further conditioned in units outside the scope of this document. The gas mixture from the $1^{st}$ stage leaves in the rotating upwardly moving vortex of gases and char ascending through the reactor lower section. The temperature of unfired reactor upper section reactor 40 is maintained from 450° F. to 1500° F., preferably from 500° F. to 1400° F. and most preferably from 550° F. to 1300° F. The hot intermediate product flowing upward from fired reactor lower section 30 provides heat for the endothermic reactions occurring in the unfired upper reactor section 40.

The temperature of the effluent from the unfired reactor upper section 40 and gas stream exiting separating device 50 are typically from about 800° F. to about 1300° F. The gas stream exiting separating device 50 is heated up through heat cross-exchanger 150 before entering a reaction zone 90 for tar removal. In one embodiment, the temperature of reaction zone 90 comprising one or more catalytic bed is maintained from 700° F. to 1900° F., preferably from 1000° F. to 1700° F. and most preferably from 1200° F. to 1600° F. In another embodiment, the temperature of reaction zone 90 comprising one or more sorbent bed is maintained from 200° F. to 1000° F. preferably from 250° F. to 600° F. and most preferably from 300° F. to 500° F.

The process of this invention is carried out at atmospheric or higher pressures. Generally, the pressure in reactor lower section 30 and reactor upper section 40 is from about 14.7 psig to about 2000 psig, preferably from 50 psig to 1500 psig and, most preferably, from 150 psig to 1200 psig. The pressure in reaction zone 90 comprising one or more catalytic bed is from about 14.7 psig to about 1500 psig, preferably from 50 psig to 1500 psig and most preferably from 150 psig to 1200 psig. In another embodiment, the pressure in reaction zone 90 comprising one or more sorbent bed is from about 14.7 psig to about 1500 psig, preferably from 50 psig to 1500 psig and most preferably from 150 psig to 1200 psig.

In the various embodiments of the present invention, the velocity or the feed rate of gases and solids passing through the dispersion devices 60 and/or 60a, of the reactor lower section reactor 30 is kept between 20 and 120 feet per second, and preferably between 20 and 90 feet per second, and most preferably between 30 and 60 feet per second. The residence time of char in the reactor lower section 30 is kept between 2 second and 10 seconds and preferably between 4 and 6 seconds. The velocity or the feed rate of the slurry stream passing through the feeding device 80 and/or 80a of the reactor upper section reactor 40 is kept between 5 feet per second, and 100 feet per second, preferably between 10 feet per second and 80 feet per second, and most preferably between 20 and 60 feet per second. The residence time in the reactor upper section 40 is maintained between 5 and 40 seconds.

The process is applicable to any particulate carbonaceous material. Preferably, however, the particulate carbonaceous material is coal which, without limitation, includes lignite, bituminous coal, sub-bituminous coal, or any combination thereof. Additional carbonaceous materials are coke from coal, coal char, coal liquefaction residues, particulate carbon, petroleum coke, carbonaceous solids derived from oil shale, tar sands, pitch, biomass, concentrated sewer sludge, bits of garbage, rubber and mixtures thereof. The foregoing exemplified materials can be in the form of comminuted solids, and for best materials handling and reaction characteristics, as pumpable slurries in a liquid carrier.

The liquid carrier for carbonaceous solid materials can be any liquid which is capable of vaporizing and participating in the reactions to form desired gaseous products, particularly carbon monoxide and hydrogen. The most readily considered liquid carrier is water which forms steam in lower reactor section 30. The steam is capable of reacting with carbon to form gaseous products which are constituents of synthesis gas. In addition, liquids other than water may be used to slurry the carbonaceous material. Preferably, the liquid is water, but it may also be a hydrocarbon such as, for example, fuel oil, residual oil, petroleum, and liquid $CO_2$. When the liquid carrier is a hydrocarbon, additional water or steam may be added to provide sufficient water for efficient reaction and for moderating the reactor temperature.

Any gas containing at least 20 percent oxygen may be used as the oxygen-containing gas fed to fired reactor lower section 30. Preferred oxygen-containing gases include oxygen, air, and oxygen-enriched air.

The concentration of particulate carbonaceous material in the carrier liquid as a slurry is only that necessary to have a pumpable mixture. In general, the concentration ranges up to 70 percent by weight of the solid material. Preferably, the concentration of particulate carbonaceous material in the slurry ranges from 30 percent to 70 percent by weight in both the first and second stages of the process. More preferably, the concentration of coal in aqueous slurry is between 45 and 69 percent by weight.

When coal is the feedstock, it can be pulverized before being blended with a liquid carrier to form slurry, or ground together with the liquid media. In general, any reasonably finely-divided carbonaceous material may be used, and any of the known methods of reducing the particle size of particulate solids may be employed. Examples of such methods include the use of ball, rod and hammer mills. While particle size is not critical, finely divided carbon particles are preferred. Powdered coal used as fuel in coal-fed power plants is typical. Such coal has a particle size distribution in which 90 percent by weight of the coal passes through a 200 mesh sieve. A coarser size of 100 mesh average particle size can also be used for more reactive materials, provided stable and non-settling slurry can be prepared.

As used herein, the term "char" refers to unburned carbon and ash particles that remain entrained within a gasification system after production of the various products.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention.

The discussion of a reference in the description of related art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

Any element in a claim that does not explicitly state "means for" performing a specified function, or "step for" performing a specific function, is not to be interpreted as a "means" or "step" clause as specified 35 U.S.C. §112 ¶ 6. In particular, the use of "step of" in the claims herein is not intended to invoke the provisions of 35 U.S.C. §112 ¶ 6.

What is claimed is:

1. A process for gasification of a carbonaceous material, comprising the steps of:
    a. introducing recycled char into a reactor lower section and partially combusting said recycled char therein with a stream comprising an oxygen-containing gas, steam or mixtures thereof, thereby evolving heat and forming mixture products comprising synthesis gas and molten slag;
    b. passing said synthesis gas from said reactor lower section upward into a reactor upper section and pyrolysing therein with a stream comprising a slurry of particulate carbonaceous material in a liquid carrier thereby forming mixture products comprising i) a gaseous product stream comprising synthesis gas and residual tar, ii) char, and iii) vapor, wherein said reactor upper section is maintained at a temperature in a range of 450° F.-1400° F.;
    c. passing said mixture products from said reactor upper section through a separation device, wherein said char is separated from said mixture products from said reactor upper section and introduced to said reactor lower section as said recycled char of step a), wherein said recycled char is dry and is the only feedstock introduced to said reactor lower section; and
    d. introducing said gaseous product stream from said reactor upper section comprising synthesis gas and residual tar into a reaction zone, where said residual tar is removed, wherein said heat evolved in said step (a) is recovered by converting said slurry of particulate carbonaceous material and said liquid carrier in step (b) into said gaseous product stream in step (b).

2. The process of claim 1 wherein step (a) is carried out at a temperature in a range of 1500° F. to 3500° F. and in a range of 14.7 psig to 2000 psig.

3. The process of claim 1 wherein step (a) is carried out at a temperature in a range of 2000° F. to 3200° F. and in a range of 50 psig to 1500 psig.

4. The process of claim 1 wherein step (b) is carried out in a range of 14.7 psig to 2000 psig.

5. The process of claim 1 wherein step (b) is carried out in a range of about 500° F. to 1400° F. and in a range of 50 psig to 1500 psig.

6. The process of claim 1 wherein said slurry of particulate carbonaceous materials in said liquid carrier is introduced to said reactor upper section by one or more feeding devices.

7. The process of claim 1 wherein said stream of step (a) and said recycled char are introduced to said reactor lower section by one or more dispersion devices.

8. The process of claim 1 wherein said stream of step (a) and said recycled char are introduced into said reactor lower section at a feeding rate in the range of 20 to 120 feet per second and a residence time of said char in said reactor lower section in the range of 2 to 10 seconds.

9. The process of claim 1 wherein said stream of step (a) and said recycled char are is introduced into said reactor lower section at a feeding rate in a range of 20 to 90 feet per second and a residence time of said char in said reactor lower section in a range of 4 to 6 seconds.

10. The process of claim 1 wherein said slurry is introduced into said reactor upper section at a feeding rate in a range of 5 to 100 feet per second and a residence time in said reactor upper section in a range of 5 to 40 seconds.

11. The process of claim 1 wherein said slurry is introduced into said reactor upper section at a feeding rate in a range of 10 to 80 feet per second and a residence time in said reactor upper section in a range of 5 to 40 seconds.

12. The process of claim 1 wherein said reaction zone comprises one or more catalytic beds comprising one or more tar-destruction catalysts that function to decompose tar.

13. The process of claim 12 wherein said reaction zone is maintained in a range of 700° F. to 1900° F. and in a range of 14.7 psig to 2000 psig.

14. The process of claim 12 wherein said reaction zone is maintained in a range of about 1000° F. to 1700° F. and in a range of 50 psig to 1500 psig.

15. The process of claim 12 wherein said catalytic bed is a catalytic fluidized bed comprising one or more tar-destruction catalysts, wherein said catalytic bed functions to decompose tar and convert carbon fines to either carbon monoxide or particulates to pass through said catalytic fluidized bed along with outlet gaseous products comprising synthesis gas.

16. The process of claim 12 wherein said catalytic bed is a catalytic fixed bed.

17. The process of claim 12 wherein said catalysts are selected from the group consisting of zeolite, supported nickel, limestone, and mixtures thereof.

18. The process of claim 1 wherein said reaction zone comprises one or more sorbent beds capable of absorbing tar to form a tar-laden sorbent,
    wherein each said sorbent bed comprises either a fixed bed or fluidized bed,
    wherein each said sorbent bed comprises a tar absorbent sorbent selected from the group consisting of activated carbon, zeolite, naturally occurring silicates and mixtures thereof.

19. The process of claim 18 wherein said reaction zone is maintained in a range of 200° F. to 1000° F. and in a range of 14.7 psig to 1500 psig.

\* \* \* \* \*